(No Model.) 2 Sheets—Sheet 1.

W. BOOTH.

BRUSH BACK OR STOCK OF PLASTIC MATERIAL.

No. 329,128. Patented Oct. 27, 1885.

Witnesses:
L. C. Hills
E. E. Masson

Inventor:
William Booth
by Chas. J. Hedrick
his attorney (No Model.) 2 Sheets—Sheet 2.
W. BOOTH.
BRUSH BACK OR STOCK OF PLASTIC MATERIAL.
No. 329,128. Patented Oct. 27, 1885.
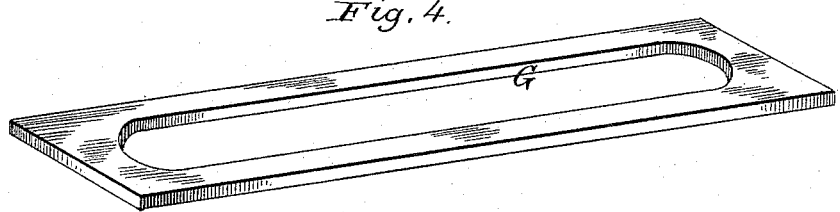
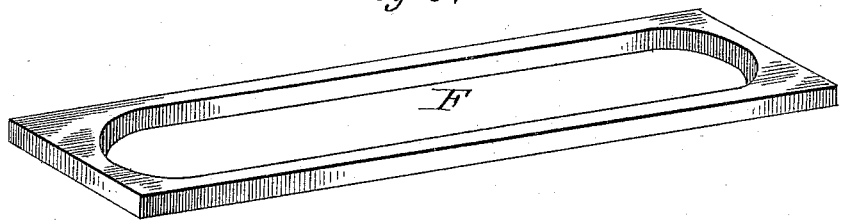
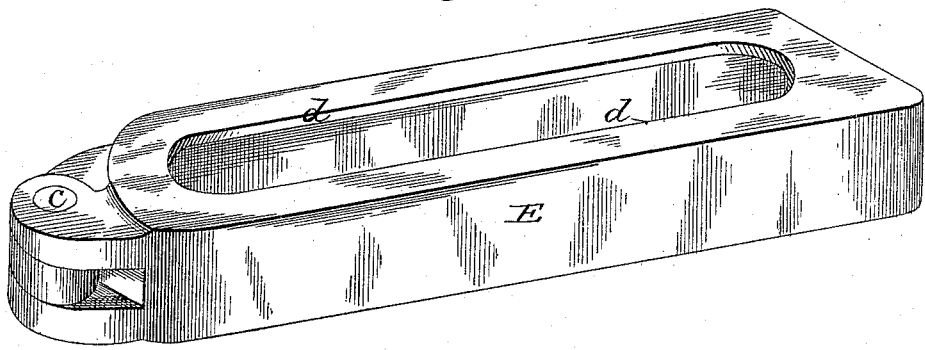
Witnesses:
L. C. Hills
E. E. Masson
Inventor:
William Booth
by Chas. J. Hedrick
his attorney

UNITED STATES PATENT OFFICE.

WILLIAM BOOTH, OF NEWARK, NEW JERSEY.

BRUSH BACK OR STOCK OF PLASTIC MATERIAL.

SPECIFICATION forming part of Letters Patent No. 329,128, dated October 27, 1885.

Application filed April 1, 1884. Serial No. 126,298. (No model.)

*To all whom it may concern:*

Be it known that I, WILLIAM BOOTH, a citizen of the United States, residing at Newark, in the county of Essex and State of New Jersey, have invented certain new and useful Improvements in Brush Backs or Stocks of Plastic Material; and I do hereby declare the following to be a full, clear, and exact description of the invention, such as will enable others skilled in the art to which it appertains to make and use the same.

This invention has particular reference to brush-backs or stocks which are composed wholly or in part of cellonite, celluloid, zylonite, lignoid, or other plastic material or materials, and are made in two or more parts, cemented or united together. Usually there is a core of wood or other cheap material, which is enveloped in a two-part shell made from the plastic material. The parts or blanks which go to make up the shell have their edges cemented together. For this purpose, after the cement is applied and the parts are fitted together, they are subjected to pressure in dies.

The invention consists in certain new or improved constructions of the parts of the brush-back, as pointed out at the end of this specification, whereby a very neat, strong, and inexpensive article is made.

Figure 1:
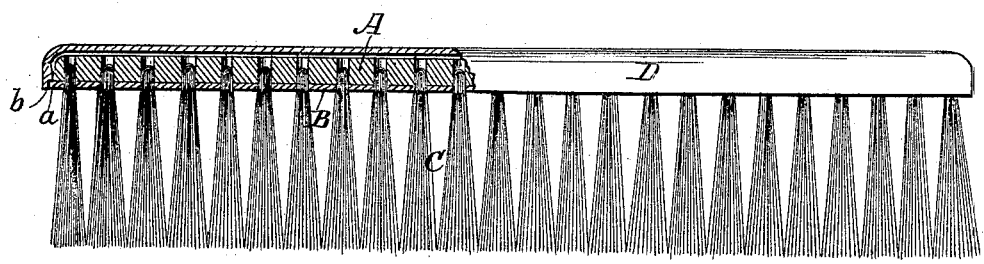
Figure 2:
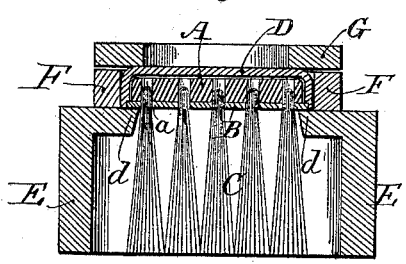
Figure 3:
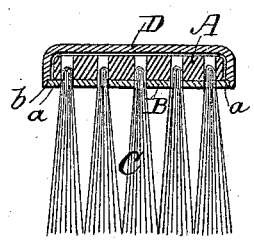

In the accompanying drawings, Figure 1 is a side view, partly in section, of a brush constructed in accordance with the invention; Fig. 2, a view in cross-section of the parts of the brush and the dies in which the same are held; Fig. 3, a cross-section of the brush; and Figs. 4, 5, and 6 views separately of the different elements making up the dies.

A is a center or core of wood or other material, which is fashioned to the desired size and shape. On the face of it is fastened a facing-sheet or face-plate, B, of the material to be used—say plastic material in the nature of cellonite, lignoid, or celluloid—which sheet is of the proper thickness. This sheet or plate is somewhat wider and longer than the core, so that when secured margin $a$ is left to project all around. It is preferably cemented to the core or center with a preparation of pyroxyline. This causes the facing material (cellonite) and that of the core (wood) to firmly unite. The core and the facing-sheet together constitute the part in which the bristles are set.

The facing-sheet B and core A are bored, and the knots or tufts of bristles C are inserted through the facing-sheet into the core, and are secured in any ordinary or suitable way—as, for example, by the usual wires.

The cap or hollow blank D is molded from plastic material (cellonite preferred) between dies. A rabbet or groove, $b$, is formed around the inside edge of the same. The depth of said cap or blank is such that it may inclose the part in which the bristles are set, including the core and facing-sheet. The facing-sheet is filed, cut, or otherwise fashioned to fit the rabbet or groove $b$ in the edge of the cap or hollow blank, so that when adjusted in place the outer surface of the sheet is flush with the edge of the cap or blank, as shown in Figs. 1, 2, 3.

Cement (usually a preparation of pyroxyline) is applied to the rabbet or groove and the edge of the facing-sheet. The core and facing-sheet are then set in the cap, the edge of the facing-sheet fitting in the rabbet or groove, as shown. The cement is then allowed to set under pressure. The dies for holding the parts together are shown in Figs. 2, 4, 5, and 6.

The die E, Figs. 2 and 6, is made in two parts, hinged together at $c$, and it has at the top a ledge, $d$, which fits under the facing-sheet around the knots or tufts of bristles. (See Fig. 2.) The die has sufficient depth to contain within itself the bristles. After the die E has been closed upon the brush, the frame F, Figs. 2 and 5, is placed on top of the same around the brush back or stock. Said frame fits the brush back or stock closely. It has for its object to keep the edges of the cap or hollow blank up to the inclosed face-sheet and prevent spreading.

The piece G is placed on top, and to it pressure is applied. The middle of this piece is removed in order that the pressure may be applied over the edge of the cap or blank rather than the middle thereof.

After pressure has been applied a sufficient time and the parts of plastic material have become thoroughly united, the brush is removed from the dies. If any cement has been squeezed out at the seam between the cap and facing-sheet, (which will not usually occur,) it is removed by filing or cutting. The seam, being on the under side, is concealed from view in the ordinary use of the article, and does not mar the finish as when on the side as heretofore. During the application of pressure the article is or may be heated to soften the plastic material so that the parts will the better adhere.

The foregoing description gives what is considered the best mode of carrying out the invention; but it is evident that modifications may be made in details without departing from the spirit of the invention, and that parts of the invention may be used separately. Leather, rubber, paper, or the like might be used for the core, but for practical use wood is preferred.

I claim the new improvements described, to wit:

1. In a brush back or stock, a molded cap or hollow blank of plastic material, provided with a rabbet or groove at the edge, substantially as described.

2. A brush back or stock composed of a molded cap or hollow blank of plastic material, provided with a rabbet or groove at the edge, and an inclosed part having a projecting margin fitted in said rabbet or groove, the knots or tufts being set in said inclosed part, substantially as described.

3. A brush back or stock comprising a core or center, a facing-sheet of plastic material, and a molded cap or hollow blank of plastic material, the said cap or blank fitting around the edge of and being cemented to the facing-sheet, so that the seam between the two is on the face or under side of the brush back or stock, substantially as described.

4. The brush back or stock composed of the center or core, the facing-sheet secured thereto, having a margin projecting beyond the edges of the core or center, and the molded cap or hollow blank provided with a rabbet or groove on the edge, the aforesaid margin fitting into said rabbet or groove, substantially as described.

In testimony whereof I affix my signature in presence of two witnesses.

WILLIAM BOOTH.

Witnesses:
JOSEPH R. FRANCE,
GEO. W. BIRCH.